United States Patent Office 3,488,469
Patented Jan. 6, 1970

3,488,469
HIGH IMPACT CORED WELDING ELECTRODE
Ralph C. Buss, Euclid, Ohio, assignor to The Lincoln Electric Company, Cleveland, Ohio, a corporation of Ohio
No Drawing. Filed Mar. 8, 1968, Ser. No. 711,481
Int. Cl. B23k 35/22
U.S. Cl. 219—146                9 Claims

ABSTRACT OF THE DISCLOSURE

A cored type welding electrode containing in the core as major ingredients calcium fluoride, magnesium and aluminum and containing as an essential and novel ingredient lithium carbonate.

---

This invention pertains to the art of electric arc welding electrodes and more particularly to a cored type electrode capable of depositing weld beads having high impact properties.

Patent No. 2,909,778 in the name of Landis and Patton issued Oct. 20, 1959, and assigned to the assignee of this application describes a cored type arc welding electrode containing in the inside: a halide of the alkali or the alkaline earth metals or aluminum fluoride; an oxide of magnesium, titanium, zirconium, aluminum or the like; and a highly reactive deoxidizer such as magnesium, aluminum, silicon, xirconium, titanium or the like and in some instances an alloying metal such as manganese, chromium, nickel or the like. Such electrode for the first time enabled the depositing of satisfactory welds in air on ordinary low carbon, low alloy steels. The electrodes described in this patent produce acceptable, physical properties for most single pass applications on plate thicknesses of less than 5/16 in. but generally are not satisfactory for heavier plates or for multiple pass operations. Further development work produced an electrode suitable for single pass welds on heavier plates and also for multiple pass operations. These results were obtained by using components which would produce a calcium fluoride, aluminum oxide, magnesium oxide slag system. Thus, calcium fluoride in substantial amounts was present in the ingredients in the core plus aluminum and magnesium as metals. The magnesium and some of the aluminum deoxidized the arc stream and melted core metal to produce aluminum oxide or magnesium oxide, as they case may be, which commingled with the molten fluorides. This slag then covered the metal drops to protect them as they crossed the arc. It then floated on the surface of the weld pool providing protection until the weld metal solidified. This slag system was found important to protect the molten weld metal from atmospheric nitrogen, which as is known, is readily taken up by the molten metal and is detrimental to the desired weld metal characteristics.

Further, the aluminum formed an exothermic reaction which improved the wetting in the weld metal giving an improved bead shape. More importantly, some of the aluminum entered the weld pool and formed a stable nitride with the nitrogen remaining in the weld metal during solidification. The stable nitride although remaining in the weld metal had little effect on its physical properties. This prevented the nitrogen from causing porosity in the weld metal. Because the weld metal nitrogen level was fairly high with this slag system, a relatively large amount of aluminum was required. This resulted in a fairly high aluminum residual in the weld metal which in turn causes a columnar grain structure and cleavage fractures. In order to improve the grain structure and eliminate these other problems, carbon was then added to the materials in the core of the electrode. This, of course, raised the carbon in the deposited weld metal and the high aluminum and high carbon made it difficult or impossible to obtain acceptable impact properties. In other words, it was necessary to put in large amounts of aluminum in the core of the electrode to tie up the free nitrogen in the weld metal. Then to counteract the adverse effects of the aluminum, carbon was added in order to get better grain structure which, in turn caused even further adverse effect on the impact properties.

Thus, the electrode just referred to for all applications except those where impact properties were a criterion has proven quite satisfactory in practice.

There are many areas where high impact properties are important and the present invention contemplates a cored type welding electrode which overcomes the above referred to problems and provides an electrode which gives a weld bead having high impact properties.

In accordance with the present invention, a cored type steel arc welding electrode is provided wherein the core contains, in addition to the ingredients above referred to, and as an essential ingredient, lithium carbonate.

The addition of lithium carbonate alone results in a radical lowering of the nitrogen in the deposited weld bead which in turn makes it possible to reduce the amount of aluminum required to properly combine with the nitrogen to form a solid nitride. Thus with the reduced level of residual aluminum in the weld metal, the grain structures and fractures are acceptable and it is no longer necessary to add additional carbon.

More specifically, the core may include one or more deoxidizers selected from the class consisting of magnesium, zirconium, titanium, calcium, lithium, aluminum, silicon and the like; one or more alloying agents selected from the class of manganese, nickel, chromium, vanadium, molybdenum, or the like; one or more halides of the alkali and alkaline earth metals and aluminum fluoride; and, as an essential ingredient: lithium carbonate. The deoxidizers produce an oxide in the slag system which is important. If more oxides are needed than the deoxidizers produce, one or more oxides of these can be included in the core. These said ingredients may be present in the following general weight percents of the total electrode weight:

|  | Percent |
|---|---|
| Halides | 1.9–14.28 |
| Oxides | 0–1.9 |
| Deoxidizers | .55–3.24 |
| Alloying agents as needed or iron powder | 0–11.4 |
| Lithium carbonate | 0.3–6.5 |
| Balance electrode | 75–85 |
| Total | 100 |

Iron powder is grouped with the alloying agents and may be employed as an inert fill material so that the weight percent of the active ingredients may be more readily adjusted to the total electrode weight. Generally for a given tube of steel, as the amount of alloying agent is increased the amount of iron powder will be correspondingly reduced.

The alloying agents may in some instances to a minor extent function as a deoxidizer. They are primarily added, however, for their beneficial effect on the weld bead physical characteristics. These agents may be used in amounts as needed to produce the desired weld bead alloy taking into account any adverse effects of the residual deoxidizers up to a maximum weight percent.

The deoxidizers are present because of their scavenging effect on oxygen. Normally there will always be some residual in the weld bead. As such, the deoxidizer functions as an alloying agent although as above pointed out sometimes the effect thereof may not always be beneficial to the weld bead physical characteristics.

The ultimate selection of the exact halide, oxide, deoxidizer, or alloying agent depends to a large extent on the relative cost per pound in relation to the effectiveness per pound. As cost of a welding electrode is very important, it is desirable to select the combination of ingredients which will give the desired ultimate performance at the minimum cost of manufacture. One such combination is comprised of the following ingredients stated in weight percent of the total electrode weight.

|  | Invention Range | Preferred Range | Preferred Specific |
|---|---|---|---|
| Calcium fluoride | 1.9–13.9 | 9.6–11.00 | 10.04 |
| Magnesium oxide | 0.0–1.9 | 1.36–1.75 | 1.56 |
| Potassium silico fluoride [1] | 0–.38 | .005–.015 | 0.10 |
| Manganese | 0–1.9 | .58–.95 | 0.78 |
| Aluminum | .55–2.1 | 1.45–1.90 | 1.76 |
| Magnesium | 0–1.14 | .78–1.05 | 0.98 |
| Iron powder | 0–9.5 | 2.30–2.70 | 2.54 |
| Lithium carbonate | 0.30–6.5 | 1.56–1.95 | 1.76 |
| Electrode | 75–85 | 79.5–82.5 | 79.5–82.5 |
|  | 100 | 100 | 100 |

[1] Composed of: Silicon 12.7%; Potassium 35.0%; Fluorine 51.0%; Impurities 1.3%.

Various other inert ingredients can be included for modifying the arc characteristics, improving the slag operation or removal, or as fillers for the tube without departing from the invention which is the use of lithium carbonate in conjunction with other arc and weld bead protecting and alloying ingredients.

In making of the present invention, a large number of materials were experimented with but lithium carbonate was the only one which served to produce the desired results. While it is not known the reasons why only lithium carbonate will function, analysis after the invention was made showed that it has unusual characteristics not found in any other carbonate heretofore used in arc welding electrodes. Thus, most carbonates have no molten phase but decompose from the solid state evolving large volumes of carbon monoxide and carbon dioxide gas which then serve to help protect the arc from the nitrogen of the air. Lithium carbonate, however, has a molten state starting at 720° C. and does not decompose until 1,310° C. which is quite close to the melting point of steel, namely 1,480° C. In its melted state, lithium carbonate exhibits an excellent wetting action which causes the molten flux to completely cover the steel as it is being heated to its melting point. This film of flux once formed does not break down as readily or as rapidly as the temperature increases. Using the calcium fluoride, aluminum and magnesium oxide slag system electrode first described, the nitrogen level of the deposited weld metal is approximately 0.05% by weight of the deposited weld metal and up. In contrast, using the electrode of the invention, the nitrogen level of the weld metal is between 0.02% and 0.035%. Furthermore, the invention enabled the aluminum level in the weld metal to be reduced from 1.5% to approximately 0.5%–0.75%, and the carbon level from 0.22%–0.25% to approximately 0.14%.

The invention has been described with reference to a preferred embodiment. The groups of ingredients listed as contained in the core are believed to be essential. Obviously other ingredients than the specific ones mentioned for alloying or other purposes may be included. For example, in an alternative embodiment the manganese is increased to 1.00% and ferro titanium (Ti 29.5%, Si 22.0%, bal. fe) is added in the amount of 0.04% to the formulations above set forth. A still further alternative embodiment wherein the core ingredients do not contain any oxides and the amount of deoxidizer is increased to compensate therefor and provide the desired amounts of oxide in the slag system is as follows:

|  | Weight percent |
|---|---|
| Calcium fluoride | 14.08 |
| Potassium silico fluoride | 0.10 |
| Manganese | 1.00 |
| Ferro titanium (29.5% Ti, 22.0% Si, bal. Fe) | 0.08 |
| Aluminum | 1.76 |
| Magnesium | 0.98 |
| Lithium carbonate | 1.76 |
| Electrode | 80.24 |
| Total | 100.00 |

Obviously, other modifications in the formulation may occur to others upon reading and understanding of this specification and it is my intention to include all such inclusions, modifications and alterations insofar as they come within the scope of the appended claims.

Having thus described my invention, I claim:

1. An arc welding electrode comprised of a tube of mild steel having on the inside thereof as major ingredients: one or more highly reactive deoxidizers taken from the class consisting of magnesium, aluminum, zirconium, titanium, silicon, calcium, lithium and the like; a material or materials selected from the class consisting of aluminum fluoride, the halides of alkali metals and the alkaline earth metals and/or materials capable of breaking down or combining in the heat of the arc to form such halides; the improvement which comprises lithium carbonate in the amounts of 0.3 to 6.5%; the balance being iron.

2. The arc welding electrode of claim 1 having 0.5 to 5.1% of the highly reactive deoxidizer; 1.9 to 14.28% of the halides.

3. The electrode of claim 1 wherein the ingredients include an alloying agent selected from the class of manganese, chromium, vanadium molybdenum and iron powder and the like in amounts of a trace to 11.4%.

4. An arc welding electrode comprised of a tube of mild steel having on the inside thereof the following ingredients in weight percents:

|  | Percent |
|---|---|
| Halides | 1.9 –14.28 |
| Oxides | 0 – 1.9 |
| Deoxidizers | .55– 3.24 |
| Alloying agents as needed or iron powder | 0 –11.4 |
| Lithium carbonate | 0.3 – 6.5 |
| Balance electrode | 75 –85 |
| Total | 100 |

5. The electrode of claim 4 comprised of: a tube of mild steel having on the inside thereof a flux having the following approximate formulation:

|  | Weight percent |
|---|---|
| Calcium fluoride | 1.9 –13.9 |
| Magnesium oxide | 0 – 1.9 |
| Potassium silico fluoride | 0 – .38 |
| Maganese | 0 – 1.9 |
| Aluminum | .55– 2.1 |
| Magnesium | 0 – 1.14 |
| Iron powder | 0 – 9.5 |
| Lithium carbonate | 0.30– 6.5 |
| Electrode | 75 –85 |
| Total | 100 |

6. The electrode of claim 5 wherein said ingredients have the following range of ingredients:

| | Weight percent |
|---|---|
| Calcium fluoride | 9.6 – 11.00 |
| Magnesium oxide | 1.36 – 1.75 |
| Potassium silico fluoride | .005 – .015 |
| Manganese | .58 – .95 |
| Aluminum | 1.45 – 1.90 |
| Magnesium | .78 – 1.05 |
| Iron powder | 2.30 – 2.70 |
| Lithium carbonate | 1.56 – 1.95 |
| Electrode | 79.5 – 82.5 |
| Total | 100.00 |

7. The electrode of claim 5 wherein said ingredients have the following approximate formulation:

| | Weight percent |
|---|---|
| Calcium fluoride | 10.04 |
| Magnesium oxide | 1.56 |
| Potassium silico fluoride | 0.10 |
| Manganese | 0.78 |
| Aluminum | 1.76 |
| Magnesium | 0.98 |
| Iron Powder | 2.54 |
| Lithium carbonate | 1.76 |
| Electrode | 79.5 – 80.48 |
| Total | 100 |

8. The electrode of claim 4 wherein said ingredients have the following approximate formulation:

| | Weight percent |
|---|---|
| Calcium fluoride | 10.04 |
| Magnesium oxide | 1.56 |
| Potassium silico fluoride | 0.10 |
| Manganese | 1.00 |
| Ferro titanium (29.5% Ti, 22.0% Si, bal. Fe) | 0.04 |
| Aluminum | 1.76 |
| Magnesium | 0.98 |
| Iron powder | 2.52 |
| Lithium carbonate | 1.76 |
| Electrode | 80.24 |
| Total | 100.00 |

9. The electrode of claim 4 wherein said ingredients have the following approximate formulation:

| | Weight percent |
|---|---|
| Calcium fluoride | 14.08 |
| Potassium silico fluoride | 0.10 |
| Manganese | 1.00 |
| Ferro titanium (29.5% Ti, 22.0% Si, bal. Fe) | 0.08 |
| Aluminum | 1.76 |
| Magnesium | 0.98 |
| Lithium carbonate | 1.76 |
| Electrode | 80.24 |
| Total | 100.00 |

References Cited

UNITED STATES PATENTS 3,177,340   4/1965   Danhier _____ 219—146

JOSEPH V. TRUHE, Primary Examiner

L. A. ROUSE, Assistant Examiner

U.S. Cl. X.R.

117—206; 148—24